(12) United States Patent
Kalfus et al.

(10) Patent No.: US 10,364,377 B2
(45) Date of Patent: Jul. 30, 2019

(54) ADHESIVE COMPOSITIONS MADE FROM PROPYLENE-BASED POLYMERS AND CRYSTALLINE C2/C3 HOMOPOLYMER

(71) Applicant: ExxonMobil Chemical Patents Inc., Baytown, TX (US)

(72) Inventors: Jan Kalfus, Spring, TX (US); Jurgen J. Schroeyers, Opvelp (BE); Jennifer J. Austin, The Woodlands, TX (US); James N. Coffey, League City, TX (US); Jean-Roch Schauder, Wavre (BE)

(73) Assignee: ExxonMobil Chemical Patents Inc., Baytown, TX (US)

( * ) Notice: Subject to any disclaimer, the term of this patent is extended or adjusted under 35 U.S.C. 154(b) by 0 days.

(21) Appl. No.: 15/782,924

(22) Filed: Oct. 13, 2017

(65) Prior Publication Data

US 2018/0037780 A1  Feb. 8, 2018

Related U.S. Application Data

(62) Division of application No. 14/958,544, filed on Dec. 3, 2015, now Pat. No. 9,816,015.

(60) Provisional application No. 62/103,200, filed on Jan. 14, 2015.

(51) Int. Cl.
| | |
|---|---|
| C08L 23/12 | (2006.01) |
| C09J 123/16 | (2006.01) |
| B32B 27/32 | (2006.01) |
| C09J 123/14 | (2006.01) |
| C08L 23/14 | (2006.01) |
| C08L 51/06 | (2006.01) |
| C08L 91/06 | (2006.01) |

(52) U.S. Cl.
CPC ........... *C09J 123/16* (2013.01); *B32B 27/327* (2013.01); *C08L 23/12* (2013.01); *C08L 23/142* (2013.01); *C08L 51/06* (2013.01); *C08L 91/06* (2013.01); *C09J 123/142* (2013.01); *B32B 2250/03* (2013.01)

(58) Field of Classification Search
CPC ..... C09J 123/16; C09J 123/142; C08L 91/06; C08L 51/06; C08L 23/142; C08L 23/12; B32B 27/327; B32B 2250/03
See application file for complete search history.

(56) References Cited

U.S. PATENT DOCUMENTS

| | | | |
|---|---|---|---|
| 6,881,800 B2 | 4/2005 | Friedersdorf | |
| 7,232,871 B2 | 6/2007 | Datta et al. | |
| 7,294,781 B1 | 11/2007 | Jiang et al. | |
| 7,601,666 B2 | 10/2009 | Rix et al. | |
| 9,238,763 B2* | 1/2016 | Tripathy et al. | ........ C09J 123/12 |
| 2002/0127389 A1 | 9/2002 | Hanada et al. | |
| 2005/0054780 A1 | 3/2005 | Zhou et al. | |
| 2011/0104493 A1* | 5/2011 | Barnholtz et al. | ........ D01F 6/46 |
| | | | 428/401 |
| 2012/0328805 A1 | 12/2012 | Davis | |
| 2013/0008600 A1* | 1/2013 | Suga et al. | ........ B29C 45/14811 |
| | | | 156/306.6 |
| 2015/0152203 A1* | 6/2015 | Neissl et al. | .......... C08F 110/06 |
| | | | 526/66 |
| 2017/0101208 A1* | 4/2017 | Minnette et al. | .... B65D 1/0215 |

FOREIGN PATENT DOCUMENTS

| | | |
|---|---|---|
| WO | 2005/100501 A | 10/2005 |
| WO | 2012/051239 A | 4/2012 |
| WO | 2013/134038 A | 9/2013 |

OTHER PUBLICATIONS

Cheng, $^{13}$C NMR Analysis of Ethylene-Propylene-Rubbers, Macromolecules, vol. 17, No. 10, 1984, pp. 1950-1955.
Sun et al., "Effects of Short Chain Branching on the Coil Dimensions of Polyolefins in Dilute Solution", Macromolecules, vol. 34, No. 19, 2001, pp. 6812-6820.

* cited by examiner

*Primary Examiner* — Nathan M Nutter

(57) ABSTRACT

The present invention is related to adhesive composition, having a polymer blend comprising a first propylene-based polymer, wherein the first propylene-based polymer is a homopolymer of propylene or a copolymer of propylene and ethylene or a $C_4$ to $C_{10}$ alpha-olefin, and a second propylene-based polymer, wherein the second propylene-based polymer is a homopolymer of propylene or a copolymer of propylene and ethylene or a $C_4$ to $C_{10}$ alpha-olefin; wherein the second propylene-based polymer is different than the first propylene-based polymer; wherein the polymer blend has a melt viscosity, measured at 190° C. and determined according to ASTM D-3236, of about 1,000 cP to about 5,000 cP; a propylene polymer; and wherein the adhesive composition is substantially free of a functionalized polyolefin, wherein the functionalized polyolefin is selected from at least one of a maleic anhydride-modified polypropylene and a maleic anhydride-modified polypropylene wax.

7 Claims, No Drawings

ADHESIVE COMPOSITIONS MADE FROM PROPYLENE-BASED POLYMERS AND CRYSTALLINE C2/C3 HOMOPOLYMER

CROSS REFERENCE TO RELATED APPLICATIONS

This application is a divisional of U.S. application Ser. No. 14/958,544, filed Dec. 3, 2015, which claims priority from U.S. Provisional Application No. 62/103,200, filed Jan. 14, 2015, and both of which are incorporated herein by reference.

FIELD OF INVENTION

The invention relates to a polyolefin adhesive composition comprising a crystalline C2/C3 homopolymer.

BACKGROUND

Adhesive composition components such as base polymers, tackifiers, and waxes are customarily provided as separate components for formulation into adhesive compositions. In adhesive packaging applications, adhesive compositions are sought that provide a desired combination of physical properties, such as reduced set time and improved mechanical strength, including fiber tear and failure mode; in adhesive assembly applications, adhesive compositions are sought that provide a desired combination of long set time.

Exemplary base polymer compositions and methods of making polymer compositions for adhesive applications are disclosed in U.S. Pat. Nos. 7,294,681 and 7,524,910. Various polymers described in these patents and/or produced by the methods disclosed in these patents have been sold by ExxonMobil Chemical Company as LINXAR™ polymers. In addition, the process platform described in these patents can sometimes be of limited robustness for developing new products or altering product design to satisfy customer needs.

WO Publication No. 2013/134038 discloses a method for producing a polymer blend having at least two different propylene-based polymers produced in parallel reactors.

Accordingly, the present invention is directed to an adhesive composition utilizing the new polymer blends with one or more C2/C3 homopolymers, such that the adhesive compositions have superior fiber tear, set time, and failure mode compared to commercial adhesive formulations.

SUMMARY

The foregoing and/or other challenges are addressed by the methods and products disclosed herein.

In one aspect, an adhesive composition is provided, wherein the adhesive composition comprises a polymer blend comprising a first propylene-based polymer, wherein the first propylene-based polymer is a homopolymer of propylene or a copolymer of propylene and ethylene or a $C_4$ to $C_{10}$ alpha-olefin, and a second propylene-based polymer, wherein the second propylene-based polymer is a homopolymer of propylene or a copolymer of propylene and ethylene or a $C_4$ to $C_{10}$ alpha-olefin; wherein the second propylene-based polymer is different than the first propylene-based polymer; wherein the polymer blend has a melt viscosity, measured at 190° C. and determined according to ASTM D-3236, of about 1,000 cP to about 5,000 cP; a propylene polymer; and wherein the adhesive composition is substantially free of a functionalized polyolefin, wherein the functionalized polyolefin is selected from at least one of a maleic anhydride-modified polypropylene and a maleic anhydride-modified polypropylene wax.

In another aspect, an adhesive composition is provided, wherein the adhesive composition comprises a polymer blend comprising a first propylene-based polymer, wherein the first propylene-based polymer is a homopolymer of propylene or a copolymer of propylene and ethylene or a $C_4$ to $C_{10}$ alpha-olefin, a second propylene-based polymer, wherein the second propylene-based polymer is a homopolymer of propylene or a copolymer of propylene and ethylene or a $C_4$ to $C_{10}$ alpha-olefin; wherein the second propylene-based polymer is different than the first propylene-based polymer; wherein the polymer blend has a melt viscosity, measured at 190° C. and determined according to ASTM D-3236, of about 1,000 cP to about 5,000 cP; and an ethylene polymer, wherein the ethylene polymer is a homopolymer of ethylene or a copolymer of ethylene units with from about 0.5 to about 4 wt. % $C_3$ to $C_{10}$ alpha-olefin comonomer derived units.

These and other aspects of the present inventions are described in greater detail in the following detailed description and are illustrated in the accompanying figure and tables.

DETAILED DESCRIPTION

It has been discovered that adding one or more tackifiers, with a specific softening point and aromaticity, to form adhesive compositions results in advantageous properties for the adhesive compositions, including set time and fiber tear equivalent to or better than commercial adhesive formulations. The inventive adhesives utilize base polymers that may be produced using a new process platform that is more robust and lacks many of the limitations and difficulties associated with the processes employed to make LINXAR™ polymers and those disclosed in U.S. Pat. Nos. 7,294,681 and 7,524,910.

A. Methods of Preparing Polyolefin Adhesive Components and Compositions

A solution polymerization process for preparing a polyolefin adhesive component is generally performed by a system that includes a first reactor, a second reactor in parallel with the first reactor, a liquid-phase separator, a devolatilizing vessel, and a pelletizer. The first reactor and second reactor may be, for example, continuous stirred-tank reactors.

The first reactor may receive a first monomer feed, a second monomer feed, and a catalyst feed. The first reactor may also receive feeds of a solvent and an activator. The solvent and/or the activator feed may be combined with any of the first monomer feed, the second monomer feed, or catalyst feed or the solvent and activator may be supplied to the reactor in separate feed streams. A first polymer is produced in the first reactor and is evacuated from the first reactor via a first product stream. The first product stream comprises the first polymer, solvent, and any unreacted monomer.

In any embodiment, the first monomer in the first monomer feed may be propylene and the second monomer in the second monomer feed may be ethylene or a $C_4$ to $C_{10}$ olefin. In any embodiment, the second monomer may be ethylene, butene, hexene, and octene. Generally, the choice of monomers and relative amounts of chosen monomers employed in the process depends on the desired properties of the first polymer and final polymer blend. For adhesive compositions, ethylene and hexene are particularly preferred comonomers for copolymerization with propylene. In any embodiment, the relative amounts of propylene and comonomer supplied to the first reactor may be designed to produce a polymer that is predominantly propylene, i.e., a polymer that is more than 50 mol % propylene. In another embodiment, the first reactor may produce a homopolymer of propylene.

The second reactor may receive a third monomer feed of a third monomer, a fourth monomer feed of a fourth monomer, and a catalyst feed of a second catalyst. The second reactor may also receive feeds of a solvent and activator. The solvent and/or the activator feed may be combined with any of the third monomer feed, the fourth monomer feed, or second catalyst feed, or the solvent and activator may be supplied to the reactor in separate feed streams. A second polymer is produced in the second reactor and is evacuated from the second reactor via a second product stream. The second product stream comprises the second polymer, solvent, and any unreacted monomer.

In any embodiment, the third monomer may be propylene and the fourth monomer may be ethylene or a $C_4$ to $C_{10}$ olefin. In any embodiment, the fourth monomer may be ethylene, butene, hexene, and octene. In any embodiment, the relative amounts of propylene and comonomer supplied to the second reactor may be designed to produce a polymer that is predominantly propylene, i.e., a polymer that is more than 50 mol % propylene. In another embodiment, the second reactor may produce a homopolymer of propylene.

Preferably, the second polymer is different than the first polymer. The difference may be measured, for example, by the comonomer content, heat of fusion, crystallinity, branching index, weight average molecular weight, and/or polydispersity of the two polymers. In any embodiment, the second polymer may comprise a different comonomer than the first polymer or one polymer may be a homopolymer of propylene and the other polymer may comprise a copolymer of propylene and ethylene or a $C_4$ to $C_{10}$ olefin. For example, the first polymer may comprise a propylene-ethylene copolymer and the second polymer may comprise a propylene-hexene copolymer. In any embodiment, the second polymer may have a different weight average molecular weight (Mw) than the first polymer and/or a different melt viscosity than the first polymer. Furthermore, in any embodiment, the second polymer may have a different crystallinity and/or heat of fusion than the first polymer. Specific examples of the types of polymers that may be combined to produce advantageous blends are described in greater detail herein.

It should be appreciated that any number of additional reactors may be employed to produce other polymers that may be integrated with (e.g., grafted) or blended with the first and second polymers. In any embodiment, a third reactor may produce a third polymer. The third reactor may be in parallel with the first reactor and second reactor or the third reactor may be in series with one of the first reactor and second reactor.

Further description of exemplary methods for polymerizing the polymers described herein may be found in U.S. Pat. No. 6,881,800, which is incorporated by reference herein.

The first product stream and second product stream may be combined to produce a blend stream. For example, the first product stream and second product stream may supply the first and second polymer to a mixing vessel, such as a mixing tank with an agitator.

The blend stream may be fed to a liquid-phase separation vessel to produce a polymer rich phase and a polymer lean phase. The polymer lean phase may comprise the solvent and be substantially free of polymer. At least a portion of the polymer lean phase may be evacuated from the liquid-phase separation vessel via a solvent recirculation stream. The solvent recirculation stream may further include unreacted monomer. At least a portion of the polymer rich phase may be evacuated from the liquid-phase separation vessel via a polymer rich stream.

In any embodiment, the liquid-phase separation vessel may operate on the principle of Lower Critical Solution Temperature (LCST) phase separation. This technique uses the thermodynamic principle of spinodal decomposition to generate two liquid phases; one substantially free of polymer and the other containing the dissolved polymer at a higher concentration than the single liquid feed to the liquid-phase separation vessel.

Employing a liquid-phase separation vessel that utilizes spinodal decomposition to achieve the formation of two liquid phases may be an effective method for separating solvent from multi-modal polymer blends, particularly in cases in which one of the polymers of the blend has a weight average molecular weight less than 100,000 g/mol, and even more particularly between 10,000 g/mol and 60,000 g/mol. The concentration of polymer in the polymer lean phase may be further reduced by catalyst selection. Catalysts of Formula I (described below), particularly dimethylsilyl bis(2-methyl-4-phenylindenyl) zirconium dichloride, dimethylsilyl bis(2-methyl-5-phenylindenyl) hafnium dichloride, dimethylsilyl bis(2-methyl-4-phenylindenyl) zirconium dimethyl, and dimethylsilyl bis(2-methyl-4-phenylindenyl) hafnium dimethyl were found to be a particularly effective catalysts for minimizing the concentration of polymer in the lean phase. Accordingly, in any embodiment, one, both, or all polymers may be produced using a catalyst of Formula I, particularly dimethylsilyl bis(2-methyl-4-phenylindenyl) zirconium dichloride, dimethylsilyl bis(2-methyl-4-phenylindenyl) hafnium dichloride, dimethylsilyl bis(2-methyl-4-phenylindenyl) zirconium dimethyl, and dimethylsilyl bis (2-methyl-4-phenylindenyl) hafnium dimethyl.

Upon exiting the liquid-phase separation vessel, the polymer rich stream may then be fed to a devolatilizing vessel for further polymer recovery. In any embodiment, the polymer rich stream may also be fed to a low pressure separator before being fed to the inlet of the devolatilizing vessel. While in the vessel, the polymer composition may be subjected to a vacuum in the vessel such that at least a portion of the solvent is removed from the polymer composition and the temperature of the polymer composition is reduced, thereby forming a second polymer composition comprising the multi-modal polymer blend and having a lower solvent content and a lower temperature than the polymer composition as the polymer composition is introduced into the vessel. The polymer composition may then be discharged from the outlet of the vessel via a discharge stream.

The cooled discharge stream may then be fed to a pelletizer where the multi-modal polymer blend is then discharged through a pelletization die as formed pellets. Pelletization of the polymer may be by an underwater, hot face, strand, water ring, or other similar pelletizer. Preferably an underwater pelletizer is used, but other equivalent pelletizing units known to those skilled in the art may also be used. General techniques for underwater pelletizing are known to those of ordinary skill in the art.

WO Publication No. 2013/134038 generally describes the method of preparing polyolefin adhesive components and compositions. The contents of WO Publication No. 2013/

134038 and its parent application U.S. Patent Application Ser. No. 61/609,020 filed Mar. 9, 2012, are both incorporated herein in their entirety.

B. Polymers

Preferred polymers are semi-crystalline propylene-based polymers. In any embodiment, the polymers may have a relatively low molecular weight, preferably about 150,000 g/mol or less. In any embodiment, the polymer may comprise a comonomer selected from the group consisting of ethylene and linear or branched $C_4$ to $C_{20}$ olefins and diolefins. In any embodiment, the comonomer may be ethylene or a $C_4$ to $C_{10}$ olefin.

The term "polymer" as used herein includes, but is not limited to, homopolymers, copolymers, interpolymers, terpolymers, etc. and alloys and blends thereof. Further, as used herein, the term "copolymer" is meant to include polymers having two or more monomers, optionally with other monomers, and may refer to interpolymers, terpolymers, etc. The term "polymer" as used herein also includes impact, block, graft, random and alternating copolymers. The term "polymer" shall further include all possible geometrical configurations unless otherwise specifically stated. Such configurations may include isotactic, syndiotactic and random symmetries. The term "polymer blend" as used herein includes, but is not limited to a blend of one or more polymers prepared in solution or by physical blending, such as melt blending.

"Propylene-based" or "predominantly propylene-based" as used herein, is meant to include any polymer comprising propylene, either alone or in combination with one or more comonomers, in which propylene is the major component (i.e., greater than 50 mol % propylene).

In any embodiment, one or more polymers of the blend may comprise one or more propylene-based polymers, which comprise propylene and from about 5 mol % to about 30 mol % of one or more comonomers selected from $C_2$ and $C_4$-$C_{10}$ α-olefins. In any embodiment, the α-olefin comonomer units may derive from ethylene, butene, pentene, hexene, 4-methyl-1-pentene, octene, or decene. The embodiments described below are discussed with reference to ethylene and hexene as the α-olefin comonomer, but the embodiments are equally applicable to other copolymers with other α-olefin comonomers. In this regard, the copolymers may simply be referred to as propylene-based polymers with reference to ethylene or hexene as the α-olefin.

In any embodiment, the one or more polymers of the blend may include at least about 5 mol %, at least about 6 mol %, at least about 7 mol %, or at least about 8 mol %, or at least about 10 mol %, or at least about 12 mol % ethylene-derived or hexene-derived units. In those or other embodiments, the copolymers may include up to about 30 mol %, or up to about 25 mol %, or up to about 22 mol %, or up to about 20 mol %, or up to about 19 mol %, or up to about 18 mol %, or up to about 17 mol % ethylene-derived or hexene-derived units, where the percentage by mole is based upon the total moles of the propylene-derived and α-olefin derived units. Stated another way, the propylene-based polymer may include at least about 70 mol %, or at least about 75 mol %, or at least about 80 mol %, or at least about 81 mol % propylene-derived units, or at least about 82 mol % propylene-derived units, or at least about 83 mol % propylene-derived units; and in these or other embodiments, the copolymers may include up to about 95 mol %, or up to about 94 mol %, or up to about 93 mol %, or up to about 92 mol %, or up to about 90 mol %, or up to about 88 mol % propylene-derived units, where the percentage by mole is based upon the total moles of the propylene-derived and alpha-olefin derived units. In any embodiment, the propylene-based polymer may comprise from about 5 mol % to about 25 mol % ethylene-derived or hexene-derived units, or from about 8 mol % to about 20 mol % ethylene-derived or hexene-derived units, or from about 12 mol % to about 18 mol % ethylene-derived or hexene-derived units.

The one or more polymers of the blend of one or more embodiments are characterized by a melting point (Tm), which can be determined by differential scanning calorimetry (DSC). For purposes herein, the maximum of the highest temperature peak is considered to be the melting point of the polymer. A "peak" in this context is defined as a change in the general slope of the DSC curve (heat flow versus temperature) from positive to negative, forming a maximum without a shift in the baseline where the DSC curve is plotted so that an endothermic reaction would be shown with a positive peak.

In any embodiment, the Tm of the one or more polymers of the blend (as determined by DSC) may be less than about 130° C., or less than about 120° C., or less than about 115° C., or less than about 110° C., or less than about 100° C., or less than about 90° C. In any embodiment, the Tm of the one or more polymers of the blend may be greater than about 25° C., or greater than about 30° C., or greater than about 35° C., or greater than about 40° C.

In one or more embodiments, the crystallization temperature (Tc) of the polymer (as determined by DSC) is less than about 100° C., or less than about 90° C., or less than about 80° C., or less than about 70° C., or less than about 60° C., or less than about 50° C., or less than about 40° C., or less than about 30° C., or less than about 20° C., or less than about 10° C. In the same or other embodiments, the Tc of the polymer is greater than about 0° C., or greater than about 5° C., or greater than about 10° C., or greater than about 15° C., or greater than about 20° C. In any embodiment, the Tc lower limit of the polymer may be 0° C., 5° C., 10° C., 20° C., 30° C., 40° C., 50° C., 60° C., and 70° C.; and the Tc upper limit temperature may be 100° C., 90° C., 80° C., 70° C., 60° C., 50° C., 40° C., 30° C., 25° C., and 20° C. with ranges from any lower limit to any upper limit being contemplated.

The polymers suitable for use herein are said to be "semi-crystalline", meaning that in general they have a relatively low crystallinity. The term "crystalline" as used herein broadly characterizes those polymers that possess a high degree of both inter and intra molecular order, and which preferably melt higher than 110° C., more preferably higher than 115° C., and most preferably above 130° C. A polymer possessing a high inter and intra molecular order is said to have a "high" level of crystallinity, while a polymer possessing a low inter and intra molecular order is said to have a "low" level of crystallinity. Crystallinity of a polymer can be expressed quantitatively, e.g., in terms of percent crystallinity, usually with respect to some reference or benchmark crystallinity. As used herein, crystallinity is measured with respect to isotactic polypropylene homopolymer. Preferably, heat of fusion is used to determine crystallinity. Thus, for example, assuming the heat of fusion for a highly crystalline polypropylene homopolymer is 190 J/g, a semi-crystalline propylene copolymer having a heat of fusion of 95 J/g will have a crystallinity of 50%. The term "crystallizable" as used herein refers to those polymers which can crystallize upon stretching or annealing. Thus, in certain specific embodiments, the semi-crystalline polymer may be crystallizable. The semi-crystalline polymers used in specific embodiments of this invention preferably have a crystallinity of from 2% to 65% of the crystallinity of isotatic polypropylene. In further embodiments, the semi-crystalline polymers may have a crystallinity of from about 3% to about 40%, or from about 4% to about 30%, or from about 5% to about 25% of the crystallinity of isotactic polypropylene.

The semi-crystalline polymer can have a level of isotacticity expressed as percentage of isotactic triads (three consecutive propylene units), as measured by $^{13}C$ NMR, of 75 mol % or greater, 80 mol % or greater, 85 mol % or greater, 90 mol % or greater, 92 mol % or greater, 95 mol % or greater, or 97 mol % or greater. In one or more embodiments, the triad tacticity may range from about 75 mol % to about 99 mol %, or from about 80 mol % to about 99 mol %, or from about 85 mol % to about 99 mol %, or from about 90 mol % to about 99 mol %, or from about 90 mol % to about 97 mol %, or from about 80 mol % to about 97 mol %. Triad tacticity is determined by the methods described in U.S. Pat. No. 7,232,871.

The semi-crystalline polymer may have a tacticity index m/r ranging from a lower limit of 4, or 6 to an upper limit of 10, or 20, or 25. The tacticity index, expressed herein as "m/r", is determined by $^{13}C$ nuclear magnetic resonance ("NMR"). The tacticity index m/r is calculated as defined by H. N. Cheng in Macromolecules, 17, 1950 (1984), incorporated herein by reference. The designation "m" or "r" describes the stereochemistry of pairs of contiguous propylene groups, "m" referring to meso and "r" to racemic. An m/r ratio of 1.0 generally describes an atactic polymer, and as the m/r ratio approaches zero, the polymer is increasingly more syndiotactic. The polymer is increasingly isotactic as the m/r ratio increases above 1.0 and approaches infinity.

In one or more embodiments, the semi-crystalline polymer may have a density of from about 0.85 g/cm$^3$ to about 0.92 g/cm$^3$, or from about 0.86 g/cm$^3$ to about 0.90 g/cm$^3$, or from about 0.86 g/cm$^3$ to about 0.89 g/cm$^3$ at room temperature and determined according to ASTM D-792. As used herein, the term "room temperature" is used to refer to the temperature range of about 20° C. to about 23.5° C.

In one or more embodiments, the semi-crystalline polymer can have a weight average molecular weight (Mw) of from about 5,000 to about 500,000 g/mol, or from about 7,500 to about 300,000 g/mol, or from about 10,000 to about 200,000 g/mol, or from about 25,000 to about 175,000 g/mol.

Weight-average molecular weight, $M_w$, molecular weight distribution (MWD) or $M_w/M_n$ where $M_n$ is the number-average molecular weight, and the branching index, g'(vis), are characterized using a High Temperature Size Exclusion Chromatograph (SEC), equipped with a differential refractive index detector (DRI), an online light scattering detector (LS), and a viscometer. Experimental details not shown below, including how the detectors are calibrated, are described in: T. Sun, P. Brant, R. R. Chance, and W. W. Graessley, Macromolecules, Volume 34, Number 19, pp. 6812-6820, 2001.

Solvent for the SEC experiment is prepared by dissolving 6 g of butylated hydroxy toluene as an antioxidant in 4 L of Aldrich reagent grade 1,2,4 trichlorobenzene (TCB). The TCB mixture is then filtered through a 0.7 µm glass pre-filter and subsequently through a 0.1 µm Teflon filter. The TCB is then degassed with an online degasser before entering the SEC. Polymer solutions are prepared by placing the dry polymer in a glass container, adding the desired amount of TCB, then heating the mixture at 160° C. with continuous agitation for about 2 hr. All quantities are measured gravimetrically. The TCB densities used to express the polymer concentration in mass/volume units are 1.463 g/mL at room temperature and 1.324 g/mL at 135° C. As used herein, the term "room temperature" is used to refer to the temperature range of about 20° C. to about 23.5° C. The injection concentration ranges from 1.0 to 2.0 mg/mL, with lower concentrations being used for higher molecular weight samples. Prior to running each sample the DRI detector and the injector are purged. Flow rate in the apparatus is then increased to 0.5 mL/min, and the DRI was allowed to stabilize for 8-9 hr before injecting the first sample. The LS laser is turned on 1 to 1.5 hr before running samples.

The concentration, c, at each point in the chromatogram is calculated from the baseline-subtracted DRI signal, $I_{DRI}$, using the following equation:

$$c = K_{DRI} I_{DRI}/(dn/dc)$$

where $K_{DRI}$ is a constant determined by calibrating the DRI, and dn/dc is the same as described below for the LS analysis. Units on parameters throughout this description of the SEC method are such that concentration is expressed in g/cm$^3$, molecular weight is expressed in kg/mol, and intrinsic viscosity is expressed in dL/g.

The light scattering detector used is a Wyatt Technology High Temperature mini-DAWN. The polymer molecular weight, M, at each point in the chromatogram is determined by analyzing the LS output using the Zimm model for static light scattering (M. B. Huglin, Light Scattering from Polymer Solutions, Academic Press, 1971):

$$[K_o c/\Delta R(\theta,c)] = [1/MP(\theta)] + 2A_2 c$$

where $\Delta R(\theta)$ is the measured excess Rayleigh scattering intensity at scattering angle θ, c is the polymer concentration determined from the DRI analysis, $A_2$ is the second virial coefficient, $P(\theta)$ is the form factor for a monodisperse random coil (described in the above reference), and $K_o$ is the optical constant for the system:

$$K_o = \frac{4\pi^2 n^2 (dn/dc)^2}{\lambda^4 N_A}$$

in which $N_A$ is the Avogadro's number, and dn/dc is the refractive index increment for the system. The refractive index, n=1.500 for TCB at 135° C. and λ=690 nm. In addition, $A_2$=0.0015 and dn/dc=0.104 for ethylene polymers, whereas $A_2$=0.0006 and dn/dc=0.104 for propylene polymers.

The molecular weight averages are usually defined by considering the discontinuous nature of the distribution in which the macromolecules exist in discrete fractions i containing $N_i$ molecules of molecular weight $M_i$. The weight-average molecular weight, $M_w$, is defined as the sum of the products of the molecular weight $M_i$ of each fraction multiplied by its weight fraction $w_i$:

$$M_w \equiv \Sigma w_i M_i = (\Sigma N_i M_i^2 / \Sigma N_i M_i)$$

since the weight fraction $w_i$ is defined as the weight of molecules of molecular weight $M_i$ divided by the total weight of all the molecules present:

$$w_i = N_i M_i / \Sigma N_i M_i$$

The number-average molecular weight, $M_n$, is defined as the sum of the products of the molecular weight $M_i$ of each fraction multiplied by its mole fraction $x_i$:

$$M_n \equiv \Sigma x_i M_i = \Sigma N_i M_i / \Sigma N_i$$

since the mole fraction $x_i$ is defined as $N_i$ divided by the total number of molecules $$x_i = N_i / \Sigma N_i$$

In the SEC, a high temperature Viscotek Corporation viscometer is used, which has four capillaries arranged in a Wheatstone Bridge configuration with two pressure transducers. One transducer measures the total pressure drop across the detector, and the other, positioned between the two sides of the bridge, measures a differential pressure. The specific viscosity, $\eta_s$, for the solution flowing through the viscometer is calculated from their outputs. The intrinsic viscosity, [η], at each point in the chromatogram is calculated from the following equation:

$$\eta_s = c[\eta] + 0.3(c[\eta])^2$$

where c was determined from the DRI output.

The branching index (g', also referred to as g'(vis)) is calculated using the output of the SEC-DRI-LS-VIS method as follows. The average intrinsic viscosity, $[\eta]_{avg}$, of the sample is calculated by:

$$[\eta]_{avg} = \frac{\sum c_i [\eta]_i}{\sum c_i}$$

where the summations are over the chromatographic slices, i, between the integration limits.

The branching index g' is defined as:

$$g' = \frac{[\eta]_{avg}}{kM_v^\alpha}$$

where k=0.000579 and α=0.695 for ethylene polymers; k=0.0002288 and α=0.705 for propylene polymers; and k=0.00018 and α=0.7 for butene polymers.

$M_v$ is the viscosity-average molecular weight based on molecular weights determined by the LS analysis:

$$M_v \equiv (\Sigma c_i M_i^\alpha / \Sigma c_i)^{1/\alpha}$$

In one or more embodiments, the semi-crystalline polymer may have a viscosity (also referred to a Brookfield viscosity or melt viscosity), measured at 190° C. and determined according to ASTM D-3236 from about 100 cP to about 500,000 cP, or from about 100 to about 100,000 cP, or from about 100 to about 50,000 cP, or from about 100 to about 25,000 cP, or from about 100 to about 15,000 cP, or from about 100 to about 10,000 cP, or from about 100 to about 5,000 cP, or from about 500 to about 15,000 cP, or from about 500 to about 10,000 cP, or from about 500 to about 5,000 cP, or from about 1,000 to about 10,000 cP, wherein 1 cP=1 mPa·sec.

In one or more embodiments, the semi-crystalline polymer may be characterized by its viscosity at 190° C. In one or more embodiments, the semi-crystalline polymer may have a viscosity that is at least about 100 cP (centipoise), or at least about 500 cP, or at least about 1,000 cP, or at least about 1,500 cP, or at least about 2,000 cP, or at least about 3,000 cP, or at least about 4,000 cP, or at least about 5,000 cP. In these or other embodiments, the semi-crystalline polymer may be characterized by a viscosity at 190° C. of less than about 100,000 cP, or less than about 75,000 cP, or less than about 50,000 cP, or less than about 25,000 cP, or less than about 20,000 cP, or less than about 15,000 cP, or less than about 10,000 cP, or less than about 5,000 cP with ranges from any lower limit to any upper limit being contemplated.

The polymers that may be used in the adhesive compositions disclosed herein generally include any of the polymers formed as disclosed in WO Publication No. 2013/134038. The triad tacticity and tacticity index of a polymer may be controlled by the catalyst, which influences the stereoregularity of propylene placement, the polymerization temperature, according to which stereoregularity can be reduced by increasing the temperature, and by the type and amount of a comonomer, which tends to reduce the length of crystalline propylene derived sequences. Such polymers made in accordance with WO Publication No. 2013/134038, when subjected to Temperature Rising Elution Fractionation, exhibit: a first fraction that is soluble at −15° C. in xylene, the first fraction having an isotactic (mm) triad tacticity of about 70 mol % to about 90 mol %; and a second fraction that is insoluble at −15° C. in xylene, the second fraction having an isotactic (mm) triad tacticity of about 85 mol % to about 98 mol %. The contents of WO Publication No. 2013/134038 and its parent application U.S. Patent Application Ser. No. 61/609,020 filed Mar. 9, 2012, are both incorporated herein in their entirety.

Polymers and blended polymer products are also provided. In any embodiment, one or more of the polymers described herein may be blended with another polymer, such as another polymer described herein, to produce a physical blend of polymers.

Catalysts/Activators

The polymers described herein may be prepared using one or more catalyst systems. As used herein, a "catalyst system" comprises at least a transition metal compound, also referred to as catalyst precursor, and an activator. Contacting the transition metal compound (catalyst precursor) and the activator in solution upstream of the polymerization reactor or in the polymerization reactor of the process described above yields the catalytically active component (catalyst) of the catalyst system. Any given transition metal compound or catalyst precursor can yield a catalytically active component (catalyst) with various activators, affording a wide array of catalysts deployable in the processes of the present invention. Catalyst systems of the present invention comprise at least one transition metal compound and at least one activator. However, catalyst systems of the current disclosure may also comprise more than one transition metal compound in combination with one or more activators. Such catalyst systems may optionally include impurity scavengers. Each of these components is described in further detail below.

The triad tacticity and tacticity index of the polymer may be controlled by the catalyst, which influences the stereoregularity of propylene placement, the polymerization temperature, according to which stereoregularity can be reduced by increasing the temperature, and by the type and amount of a comonomer, which tends to reduce the length of crystalline propylene derived sequences.

In any embodiment, the catalyst systems used for producing semi-crystalline polymers may comprise a metallocene compound. In any embodiment, the metallocene compound may be a bridged bisindenyl metallocene having the general formula $(In^1)Y(In^2)MX_2$, where $In^1$ and $In^2$ are identical substituted or unsubstituted indenyl groups bound to M and bridged by Y, Y is a bridging group in which the number of atoms in the direct chain connecting $In^1$ with $In^2$ is from 1 to 8 and the direct chain comprises C, Si, or Ge; M is a Group 3, 4, 5, or 6 transition metal; and $X_2$ are leaving groups. $In^1$ and $In^2$ may be substituted or unsubstituted. If In¹ and In² are substituted by one or more substituents, the substituents are selected from the group consisting of a halogen atom, $C_1$ to $C_{10}$ alkyl, $C_5$ to $C_{15}$ aryl, $C_6$ to $C_{25}$ alkylaryl, and Si-, N- or P-containing alkyl or aryl. Each leaving group X may be an alkyl, preferably methyl, or a halide ion, preferably chloride or fluoride. Exemplary metallocene compounds of this type include, but are not limited to, μ-dimethylsilylbis(indenyl) hafnium dimethyl and μ-dimethylsilylbis(indenyl) zirconium dimethyl.

In any embodiment, the metallocene compound may be a bridged bisindenyl metallocene having the general formula $(In^1)Y(In^2)MX_2$, where In¹ and In² are identical 2,4-substituted indenyl groups bound to M and bridged by Y, Y is a bridging group in which the number of atoms in the direct chain connecting In¹ with In² is from 1 to 8 and the direct chain comprises C, Si, or Ge, M is a Group 3, 4, 5, or 6 transition metal, and $X_2$ are leaving groups. In¹ and In² are substituted in the 2 position by a $C_1$ to $C_{10}$ alkyl, preferably a methyl group and in the 4 position by a substituent selected from the group consisting of $C_5$ to $C_{15}$ aryl, $C_6$ to $C_{25}$ alkylaryl, and Si-, N- or P-containing alkyl or aryl. Each leaving group X may be an alkyl, preferably methyl, or a halide ion, preferably chloride or fluoride. Exemplary metallocene compounds of this type include, but are not limited to, (dimethylsilyl)bis(2-methyl-4-(3,'5'-di-tert-butylphenyl) indenyl) zirconium dimethyl, (dimethylsilyl)bis(2-methyl-4-(3,'5'-di-tert-butylphenyl)indenyl) hafnium dimethyl, (dimethylsilyl)bis(2-methyl-4-naphthylindenyl) zirconium dimethyl, (dimethylsilyl)bis(2-methyl-4-naphthylindenyl) hafnium dimethyl, (dimethylsilyl)bis(2-methyl-4-(N-carbazyl)indenyl) zirconium dimethyl, and (dimethylsilyl)bis(2-methyl-4-(N-carbazyl)indenyl) hafnium dimethyl.

Alternatively, in any embodiment, the metallocene compound may correspond to one or more of the formulas disclosed in U.S. Pat. No. 7,601,666. Such metallocene compounds include, but are not limited to, dimethylsilyl bis(2-(methyl)-5,5,8,8-tetramethyl-5,6,7,8-tetrahydrobenz (f)indenyl) hafnium dimethyl, diphenylsilyl bis(2-(methyl)-5,5,8,8-tetramethyl-5,6,7,8-tetrahydrobenz(f)indenyl) hafnium dimethyl, diphenylsilyl bis(5,5,8,8-tetramethyl-5,6,7,8-tetrahydrobenz(f)indenyl) hafnium dimethyl, diphenylsilyl bis(2-(methyl)-5,5,8,8-tetramethyl-5,6,7,8-tetrahydrobenz(f) indenyl) zirconium dichloride, and cyclopropylsilyl bis(2-(methyl)-5,5,8,8-tetramethyl-5,6,7,8-tetrahydrobenz(f) indenyl) hafnium dimethyl.

In any embodiment, the activators of the catalyst systems used to produce semi-crystalline polymers may comprise a cationic component. In any embodiment, the cationic component may have the formula $[R^1R^2R^3AH]^+$, where A is nitrogen, $R^1$ and $R^2$ are together a —$(CH_2)_a$— group, where a is 3, 4, 5, or 6 and form, together with the nitrogen atom, a 4-, 5-, 6-, or 7-membered non-aromatic ring to which, via adjacent ring carbon atoms, optionally one or more aromatic or heteroaromatic rings may be fused, and $R^3$ is $C_1$, $C_2$, $C_3$, $C_4$, or $C_5$ alkyl, or N-methylpyrrolidinium or N-methylpiperidinium. Alternatively, in any embodiment, the cationic component has the formula $[R_nAH_{4-n}]^+$, where A is nitrogen, n is 2 or 3, and all R are identical and are $C_1$ to $C_3$ alkyl groups, such as for example trimethylammonium, trimethylanilinium, triethylammonium, dimethylanilinium, or dimethylammonium.

A particularly advantageous catalyst that may be employed in any embodiment is illustrated in Formula I.

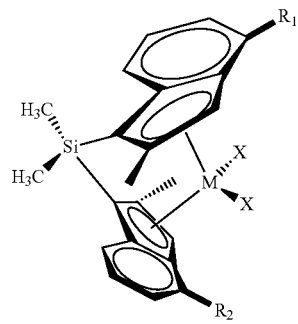

Formula I

In any embodiment, M is a Group IV transition metal atom, preferably a Group IVB transition metal, more preferably hafnium or zirconium, and X are each an alkyl, preferably methyl, or a halide ion, preferably chloride or fluoride. Methyl or chloride leaving groups are most preferred. In any embodiment, R1 and R2 may be independently selected from the group consisting of hydrogen, phenyl, and naphthyl. R1 is preferably the same as R2. Particularly advantageous species of Formula I are dimethylsilyl bis(2-methyl-4-phenylindenyl) zirconium dichloride, dimethylsilyl bis(2-methyl-4-phenylindenyl) zirconium dimethyl, dimethylsilyl bis(2-methyl-4-phenylindenyl) hafnium dichloride, and dimethylsilyl bis(2-methyl-4-phenylindenyl) hafnium dimethyl.

Any catalyst system resulting from any combination of a metallocene compound, a cationic activator component, and an anionic activator component mentioned in this disclosure shall be considered to be explicitly disclosed herein and may be used in accordance with the present invention in the polymerization of one or more olefin monomers. Also, combinations of two different activators can be used with the same or different metallocene(s).

In any embodiment, the activators of the catalyst systems used to produce the semi-crystalline polymers may comprise an anionic component, $[Y]^-$. In any embodiment, the anionic component may be a non-coordinating anion (NCA), having the formula $[B(R^4)_4]^-$, where $R^4$ is an aryl group or a substituted aryl group, of which the one or more substituents are identical or different and are selected from the group consisting of alkyl, aryl, a halogen atom, halogenated aryl, and haloalkylaryl groups. The substituents may be perhalogenated aryl groups, or perfluorinated aryl groups, including, but not limited to, perfluorophenyl, perfluoronaphthyl and perfluorobiphenyl.

Together, the cationic and anionic components of the catalysts systems described herein form an activator compound. In any embodiment, the activator may be N,N-dimethylanilinium-tetra(perfluorophenyl)borate, N,N-dimethylanilinium-tetra(perfluoronaphthyl)borate, N,N-dimethylanilinium-tetrakis(perfluorobiphenyl)borate, N,N-dimethylanilinium-tetrakis(3,5-bis(trifluoromethyl)phenyl) borate, triphenylcarbenium-tetra(perfluorophenyl)borate, triphenylcarbenium-tetra(perfluoronaphthyl)borate, triphenylcarbenium-tetrakis(perfluorobiphenyl)borate, or triphenylcarbenium-tetrakis(3,5-bis(trifluoromethyl)phenyl)borate.

A non-coordinating anion activator may be employed with the catalyst. A particularly advantageous activator is dimethylaniliniumtetrakis(heptafluoronaphthyl) borate.

Suitable activators for the processes of the present invention also include aluminoxanes (or alumoxanes) and aluminum alkyls. Without being bound by theory, an alumoxane is typically believed to be an oligomeric aluminum compound represented by the general formula $(R^x\text{—Al—O})_n$, which is a cyclic compound, or $R^x (R^x\text{—Al—O})_n AlR^x_2$, which is a linear compound. Most commonly, alumoxane is believed to be a mixture of the cyclic and linear compounds. In the general alumoxane formula, $R^x$ is independently a $C_1$-$C_{20}$ alkyl radical, for example, methyl, ethyl, propyl, butyl, pentyl, isomers thereof, and the like, and n is an integer from 1-50. In any embodiment, $R^x$ may be methyl and n may be at least 4. Methyl alumoxane (MAO), as well as modified MAO containing some higher alkyl groups to improve solubility, ethyl alumoxane, iso-butyl alumoxane, and the like are useful for the processes disclosed herein.

Further, the catalyst systems suitable for use in the present invention may contain, in addition to the transition metal compound and the activator described above, additional activators (co-activators), and/or scavengers. A co-activator is a compound capable of reacting with the transition metal complex, such that when used in combination with an activator, an active catalyst is formed. Co-activators include alumoxanes and aluminum alkyls.

In any embodiment, scavengers may be used to "clean" the reaction of any poisons that would otherwise react with the catalyst and deactivate it. Typical aluminum or boron alkyl components useful as scavengers are represented by the general formula $R^x JZ_2$ where J is aluminum or boron, $R^x$ is a $C_1$-$C_{20}$ alkyl radical, for example, methyl, ethyl, propyl, butyl, pentyl, and isomers thereof, and each Z is independently $R^x$ or a different univalent anionic ligand such as halogen (Cl, Br, I), alkoxide ($OR^x$), and the like. Exemplary aluminum alkyls include triethylaluminum, diethylaluminum chloride, ethylaluminium dichloride, tri-iso-butylaluminum, tri-n-octylaluminum, tri-n-hexylaluminum, trimethylaluminum, and combinations thereof. Exemplary boron alkyls include triethylboron. Scavenging compounds may also be alumoxanes and modified alumoxanes including methylalumoxane and modified methylalumoxane.

Solvents

The solvent used in the reaction system of the present invention may be any non-polymeric species capable of being removed from the polymer composition by heating to a temperature below the decomposition temperature of the polymer and/or reducing the pressure of the solvent/polymer mixture. In any embodiment, the solvent may be an aliphatic or aromatic hydrocarbon fluid.

Examples of suitable, preferably inert, hydrocarbon fluids are readily volatile liquid hydrocarbons, which include, for example, hydrocarbons containing from 1 to 30, preferably 3 to 20, carbon atoms. Preferred examples include propane, n-butane, isobutane, mixed butanes, n-pentane, isopentane, neopentane, n-hexane, cyclohexane, isohexane, octane, other saturated $C_6$ to $C_8$ hydrocarbons, toluene, benzene, ethylbenzene, chlorobenzene, xylene, desulphurized light virgin naphtha, and any other hydrocarbon solvent recognized by those skilled in the art to be suitable for the purposes of this invention. Particularly preferred solvents for use in the processes disclosed herein are n-hexane and toluene.

The optimal amount of solvent present in combination with the polymer at the inlet to the devolatilizer will generally be dependent upon the desired temperature change of the polymer melt within the devolatilizer, and can be readily determined by persons of skill in the art. For example, the polymer composition may comprise, at the inlet of the devolatilizer, from about 1 wt. % to about 50 wt. % solvent, or from about 5 wt. % to about 45 wt. % solvent, or from about 10 wt. % to about 40 wt. % solvent, or from about 10 wt. % to about 35 wt. % solvent.

WO Publication No. 2013/134038 generally describes the catalysts, activators, and solvents used to prepare the polymer blend used in the adhesive compositions. The contents of WO Publication No. 2013/134038 and its parent application U.S. Patent Application Ser. No. 61/609,020 filed Mar. 9, 2012, are both incorporated herein in their entirety.

C. $C_2$/$C_3$ Homopolymers

Propylene Polymer

In an embodiment, the adhesive compositions described herein may comprise a propylene polymer ("PP"). A PP useful for making the adhesive composition of the invention is a homopolymer of propylene or a copolymer of propylene and within the range from 0.05 or 0.1 or 0.5 wt. % to 2.0 or 4.0 wt. % ethylene or $C_4$ to $C_{10}$ α-olefin comonomer derived units. Preferably, the PP useful herein is a homopolymer of propylene. The PP is preferably a high crystallinity polypropylene, having a crystallinity of at least 40%, more preferably at least 70% or 80% or 90% as determined by DSC. Preferably, the polypropylene has a melting point temperature ("$T_m$", DSC) within the range of from 130° C. or 140° C. or 150° C. to 160° C. or 165° C. or 170° C. In an embodiment, the PP has a Melt Flow Rate ("MFR", 230° C./2.16 kg) within the range of from 0.8 or 10 or 100 or 500 or 1,000 g/10 min to 1,500 or 2,000 or 3,000 or 5,000 g/10 min. In an embodiment, the PP has a melt viscosity at 190° C. within the range of from about 10,000 to about 15,000 cP. Suitable commercially available PPs include Achieve™ 6936G2, (referred to herein as PP1) having a MFR (ASTM D-1238, 230° C./2.16 kg) of about 1,500 g/10 min; PP5341 (referred to herein as PP2) having a MFR (ASTM D-1238, 230° C./2.16 kg) of about 1 g/10 min; PLTD-2100 (referred to herein as PP3) having a MFR (ASTM D-1238, 230° C./2.16 kg) of about 2,500 g/10 min; PLTD-2103 (referred to herein as PP4); PDH076 (referred to herein as PP5) having a MFR (ASTM D-1238, 230° C./2.16 kg) of about 2,239 g/10 min and a viscosity (ASTM D-3236, 190° C.) of about 6,850 cP; PLTD-2134 (referred to herein as PP6) having a MFR (ASTM D-1238, 230° C./2.16 kg) of about 4,000 g/10 min and a viscosity (ASTM D-3236, 190° C.) of about 2,708 cP, all available from ExxonMobil Chemical. The propylene-based polymer may be present in the adhesive composition in the range of from 0.04 or 1 or 3 or 5 wt. % to 7 or 10 or 15 wt. % based on the adhesive composition. In an embodiment, the adhesive composition is substantially free of a propylene-based polymer component.

Ethylene Polymer

In an embodiment, the adhesive compositions described herein may comprise an ethylene polymer ("EP"). A EP useful for making the adhesive composition of the invention is a homopolymer of ethylene or a copolymer of ethylene and within the range from 0.05 or 0.1 or 0.5 wt. % to 2.0 or 4.0 wt. % $C_3$ to $C_{10}$ α-olefin comonomer derived units. Preferably, the EP useful herein is a homopolymer of ethylene. Suitable commercially available EPs include those available under the trade name of Epolene, including Epolene C15, Epolene N15, and Epolene C18, from Westlake Chemical Corp. The ethylene-based polymer may be present in the adhesive composition in the range of from 5 or 10 or 15 wt. % to 20 or 30 or 35 wt. % based on the adhesive composition. In an embodiment, the adhesive composition is substantially free of an ethylene-based polymer component.

D. Tackifier

In an embodiment, the adhesive composition may include one or more tackifiers. The term "tackifier" is used herein to refer to an agent that allows the polymer of the composition to be more adhesive by improving wetting during the application. Tackifiers may be produced from petroleum-derived hydrocarbons and monomers of feedstock including tall oil and other polyterpene or resin sources. Tackifying agents are added to give tack to the adhesive and also to modify viscosity. Tack is required in most adhesive formulations to allow for proper joining of articles prior to the adhesive composition solidifying. The term "tackifier" as used herein includes a blend of one or more tackifiers. Suitable tackifiers include those commercially available under the trade name Escorez™ from ExxonMobil Chemical and Sylvares™ from Arizona Chemical.

The tackifier may be present in the adhesive composition in the range of from 5 or 10 wt. % to 15 or 20 or 30 or 35 wt. % based on the adhesive composition. In embodiments, other tackifiers may be used with the polymer blends of the invention including, but not limited to, alkylphenolic, coumarone indene, other hydrogenated or non-hydrogenated hydrocarbon resins, hydroxylated polyester resin, phenolic, pure monomer styrene, resin dispersion, rosin ester, rosin, and terpene tackifiers. In an embodiment of the invention, the adhesive composition may be substantially free of a tackifier.

E. Additives: Wax, Antioxidant, Functionalized Polyolefin

In an embodiment, the adhesive composition described herein may include other additives, e.g., waxes, antioxidants, functionalized polyolefins, and combinations thereof, with one or more of tackifiers, as described above.

The term "wax" is used herein to refer to a substance that tweaks the overall viscosity of the adhesive composition. The primary function of wax is to control the set time of the adhesive system. Adhesive compositions of the present invention may comprise paraffin (petroleum) waxes and microcrystalline waxes. A suitable commercially available wax include those available under the trade name Polywax from Baker Hughes.

In embodiments, the adhesive compositions may have no wax. In embodiments, other waxes may be used with the polymer blends of the invention including, but not limited to, Castor Oil derivatives (HCO-waxes), ethylene co-terpolymers, Fisher-Tropsch waxes, microcrystalline, paraffin, polyolefin modified, and polyolefin.

The term "functionalized polymer component" is used herein to refer to maleic anhydride-modified polypropylene and maleic anhydride-modified polypropylene wax. A useful commercially available functionalized polyolefin is Honeywell AC 596.

The term "antioxidant" is used herein to refer to high molecular weight hindered phenols and multifunctional phenols. A useful commercially available antioxidant is Irganox™ 1010. Irganox 1010 is a hindered phenolic antioxidant available from BASF SE Corporation located in Ludwigshafen, Germany. The invention is not limited to the Irganox 1010 as the antioxidant. In embodiments, the adhesive compositions may have no antioxidant. In embodiments, the adhesive compositions may have from about 0.01 to about 1 wt. % of antioxidant, F. Applications of Polyolefin Adhesive Compositions
Packaging The adhesive formulations disclosed herein can be used in various packaging articles. The packaging article may be useful as a carton, container, crate, case, corrugated case, or tray, for example. More particularly, the packaging article may be useful as a cereal product, cracker product, beer packaging, frozen food product, paper bag, drinking cup, milk carton, juice carton, drinking cup, or as a container for shipping produce. The packaging article is formed by applying an adhesive composition to at least a portion of one or more packaging elements. The packaging elements may be formed from paper, paperboard, containerboard, tagboard, corrugated board, chipboard, kraft, cardboard, fiberboard, plastic resin, metal, metal alloys, foil, film, plastic film, laminates, sheeting, or any combination thereof. In one aspect, the adhesive composition may be used to bind or bond two or more packaging elements together wherein the packaging elements are formed from the same or different type of materials. Accordingly, the packaging elements may be individually formed from paper, paperboard, containerboard, tagboard, corrugated board, chipboard, kraft, cardboard, fiberboard, plastic resin, metal, metal alloys, foil, film, plastic film, laminates, sheeting, or any combination thereof. The one or more packaging elements may also be individually coated using paper, foil, metal, metal alloys, polyethylene, polypropylene, polyester, polyethylene terephthalate, polyvinyl chloride, polyvinylidine chloride, polyvinyl acetate, polyamides, homopolymers thereof, and combinations and copolymers thereof.

Woodworking/Assembly

The adhesive formulations disclosed herein can be used in various woodworking applications including, but not limited to furniture, toys, musical instruments, window frames and sills, doors, flooring, fencing, tools, ladders, sporting goods, dog houses, gazebos/decks, picnic tables, playground structures, planters, scaffolding planks, kitchen utensils, coffins, church pews/altars, and canes. The adhesive formulations described herein, having a high polymer load, provide a desired combination of physical properties such as stable adhesion over time, indicative of broad application temperature ranges, and a long open time and therefore can be used in a variety of woodworking applications disclosed herein. It should be appreciated that the adhesive formulations of the present disclosure, while being well suited for use in woodworking products, may also find utility in other applications as well.

In a particular embodiment, a woodworking process to prepare the woodworking application involves forming a woodworking article by applying an adhesive composition to at least a portion of a structural element. The structural element can include a variety of materials, which include, but are not limited to wood or plywood, or plastic or veneer. For example, the structural element can also include lumber, wood, fiberboard, plasterboard, gypsum, wallboard, plywood, PVC, melamine, polyester, impregnated paper and sheetrock. A woodworking process can be used to form indoor furniture, outdoor furniture trim, molding, doors, sashes, windows, millwork and cabinetry, for example.

SPECIFIC EMBODIMENTS

The invention may also be understood with relation to the following specific embodiments:

Paragraph A: An adhesive composition comprising a polymer blend comprising a first propylene-based polymer, wherein the first propylene-based polymer is a homopolymer of propylene or a copolymer of propylene and ethylene or a $C_4$ to $C_{10}$ alpha-olefin, and a second propylene-based polymer, wherein the second propylene-based polymer is a homopolymer of propylene or a copolymer of propylene and ethylene or a $C_4$ to $C_{10}$ alpha-olefin; wherein the second propylene-based polymer is different than the first propylene-based polymer; wherein the polymer blend has a melt viscosity, measured at 190° C. and determined according to ASTM D-3236, of about 1,000 cP to about 5,000 cP; a propylene polymer; and wherein the adhesive composition is substantially free of a functionalized polyolefin, wherein the functionalized polyolefin is selected from at least one of a maleic anhydride-modified polypropylene and a maleic anhydride-modified polypropylene wax.

Paragraph B: The adhesive composition of Paragraph A, wherein the polymer blend is present in the amount of about 70 to about 90 wt. % based on the adhesive composition.

Paragraph C: The adhesive composition of Paragraph A and/or B, wherein the propylene polymer is a homopolymer of propylene or a copolymer of propylene units with from about 0.5 to about 4 wt. % ethylene or $C_4$ to $C_{10}$ alpha-olefin comonomer derived units.

Paragraph D: The adhesive composition of any one or any combination of Paragraphs A to C, wherein the propylene polymer has a melt flow rate, measured according to ASTM D-1238 at 230° C. and 2.16 kg, of less than about 1,000 g/10 min.

Paragraph E: The adhesive composition of any one or any combination of Paragraphs A to D, further comprising one or more tackifiers.

Paragraph F: The adhesive composition of any one or any combination of Paragraphs A to E, wherein the adhesive composition is substantially free of a wax.

Paragraph G: An article comprising the adhesive composition of any one or any combination of Paragraphs A to F.

Paragraph H: An article of Paragraph G, wherein the adhesive composition adheres two substrates, and wherein each substrate comprises at least one of paper, cardboard, plastic, nonwoven, metal, wood, other natural fiber based material, or combinations thereof.

Paragraph I: A process to prepare the adhesive composition of Paragraph A.

Paragraph J: An adhesive composition comprising a polymer blend comprising a first propylene-based polymer, wherein the first propylene-based polymer is a homopolymer of propylene or a copolymer of propylene and ethylene or a $C_4$ to $C_{10}$ alpha-olefin, a second propylene-based polymer, wherein the second propylene-based polymer is a homopolymer of propylene or a copolymer of propylene and ethylene or a $C_4$ to $C_{10}$ alpha-olefin; wherein the second propylene-based polymer is different than the first propylene-based polymer; wherein the polymer blend has a melt viscosity, measured at 190° C. and determined according to ASTM D-3236, of about 1,000 cP to about 5,000 cP; and an ethylene polymer, wherein the ethylene polymer is a homopolymer of ethylene or a copolymer of ethylene units with from about 0.5 to about 4 wt. % $C_3$ to $C_{10}$ alpha-olefin comonomer derived units.

Paragraph K: The adhesive composition of Paragraph J, wherein the polymer blend is present in the amount of about 25 to about 95 wt. % based on the adhesive composition.

Paragraph L: The adhesive composition of Paragraph J and/or K, wherein the polymer blend is present in the amount of about 30 to about 80 wt. % based on the adhesive composition.

Paragraph M: The adhesive composition of any one or any combination of Paragraphs J to L, further comprising a functionalized polyolefin, wherein the functionalized polyolefin is selected from at least one of a maleic anhydride-modified polypropylene and a maleic anhydride-modified polypropylene wax, wherein the functionalized polyolefin is present in the amount of less than or equal to about 5 wt. % based on the adhesive composition.

Paragraph N: The adhesive composition of any one or any combination of Paragraphs J to M, further comprising a propylene polymer, wherein the propylene polymer is a homopolymer of propylene or a copolymer of propylene units with from about 0.5 to about 4 wt. % ethylene or $C_4$ to $C_{10}$ alpha-olefin comonomer derived units.

Paragraph O: The adhesive composition of Paragraph N, wherein the propylene polymer is present in the amount of less than or equal to about 10 wt %. based on the adhesive composition.

Paragraph P: The adhesive composition of any one or any combination of Paragraphs J to O, further comprising one or more tackifiers.

Paragraph Q: The adhesive composition of any one or any combination of Paragraphs J to P, further comprising a wax, wherein the wax is present in the amount of less than or equal to about 5 wt. % based on the adhesive composition.

Paragraph R: The adhesive composition of Paragraph J, wherein the adhesive composition is substantially free of the wax.

Paragraph S: An article comprising the adhesive composition of any one or any combination of Paragraphs J to R.

Paragraph T: An article of Paragraph J, wherein the adhesive composition adheres two substrates, and wherein each substrate comprises at least one of paper, cardboard, plastic, nonwoven, metal, wood, other natural fiber based material, or combinations thereof.

Paragraph U: A process to prepare the adhesive composition of Paragraph J.

Paragraph V: A process to prepare an adhesive composition, comprising blending (a) a polymer blend comprising a first propylene-based polymer, wherein the first propylene-based polymer is a homopolymer of propylene or a copolymer of propylene and ethylene or a $C_4$ to $C_{10}$ alpha-olefin, a second propylene-based polymer, wherein the second propylene-based polymer is a homopolymer of propylene or a copolymer of propylene and ethylene or a $C_4$ to $C_{10}$ alpha-olefin; wherein the second propylene-based polymer is different than the first propylene-based polymer; wherein the polymer blend has a melt viscosity, measured at 190° C. and determined according to ASTM D-3236, of about 1,000 cP to about 5,000 cP; and either (i) a propylene polymer, wherein the propylene polymer is a homopolymer of propylene or a copolymer of propylene units with from about 0.5 to about 4 wt. % ethylene or $C_4$ to $C_{10}$ alpha-olefin comonomer derived units; or (ii) an ethylene polymer, wherein the ethylene polymer is a homopolymer of ethylene or a copolymer of ethylene units with from about 0.5 to about 4 wt. % $C_3$ to $C_{10}$ alpha-olefin comonomer derived units.

EXAMPLES

"Fiber tear" describes the bond strength of the adhesive to the substrate and is measured at 25° C., room temperature, 16.5° C., 5° C., 2° C., and −18° C. As used herein, the term "room temperature" is used to refer to the temperature range of about 20° C. to about 23.5° C. Fiber tear is a visual measurement as to the amount of paper substrate fibers that are attached to a bond after the substrates are torn apart. 100% fiber tear means the adhesive is stronger than the substrate and 100% of the adhesive is covered in substrate fibers. Fiber tear is determined by bonding together substrates with the adhesive. A drop of molten adhesive (180° C.) is positioned on one of the substrates. The second substrate is placed on top of the adhesive, and a 500 g weight is placed on top of the second substrate for even application. The adhesive is cooled at the referenced temperature for at least one hour. The substrates are then torn apart and the adhesive is inspected for fiber tear. In the present invention, fiber tear of at least 60% is desired. Preferably, the fiber tear is greater than 90%.

"Set time" is the minimum time interval, after bonding two substrates, during which the cohesive strength of the bond becomes stronger than joint stress. It represents the time necessary to cool down an adhesive composition and obtain a good bond. Set time is determined by bonding together substrates with the adhesive after the molten adhesive (180° C.) has been dropped onto one of the substrates with an eye dropper. The second substrate is placed on top of the adhesive, and a 500 g weight is placed on top of the second substrate for even application. After a predetermined interval of time, the second substrate is removed and checked for fiber tear. If no fiber tear is found, a longer interval of time is tried. This is continued until fiber tear is found. This length of time is reported as the set time in seconds.

"Peel adhesion failure temperature" (PAFT) is defined as the temperature at which the adhesive bond of the composition fails. PAFT of a hot melt adhesive composition is tested according to the standard PAFT test based on ASTM D-4498. PAFT is a critical factor for storing boxes in environments above ambient temperature, such as warehouses. PAFT is measured in ° C. In the present invention, a PAFT of at least 50° C. is desired. Preferably, the PAFT is 55° C. or higher.

"Failure Mode" is defined as whether the adhesive bonds or fails when used to adhere a substrate to an inland board. Failure mode is determined at 5° C., 16.5° C., room temperature, and 25° C. As used herein, the term "room temperature" is used to refer to the temperature range of about 20° C. to about 23.5° C. FT indicates fiber tear when the adhesive damages the substrate surface. SF indicates substrate failure or separation of the corrugated. AB indicates adhesive break when the adhesive cracks with partial adhesive transfer. Typically, 5 cardboard specimens are glued together, allowed to cool, pulled apart and the average percent fiber tear is recorded. Where there is more than one mode of failure each mode is listed, e.g., 3AB, 2FT indicates 3 of the 5 specimens had adhesive break while 2 of the 5 specimens showed fiber tear.

In a pilot plant, propylene-ethylene copolymers are produced by reacting a feed stream of propylene with a feed stream of ethylene in the presence of a metallocene catalyst. Table 1 shows properties of polymer blends used in the Examples, including Viscosity at 190° C., DSC Crystallinity, Shore Hardness C, Ethylene Content, DSC Melting Point, and Modality. These polymer blends are generally produced in accordance with the method disclosed in WO Publication No. 2013/134038. The polymer blend PBC 1 of the example of the invention has an ethylene content of about 4.7 wt. %, a melt viscosity at 190° C. of about 1,210 cP, a Heat of Fusion of about 46 J/g, a Shore Hardness C of about 60, a Melting Temperature of about 97° C., and a Crystallization Temperature of about 38° C. The polymer blend PBC 2 of the example of the invention has an ethylene content of about 12.4 wt. %, a melt viscosity at 190° C. of about 4110 cP, a Heat of Fusion of about 23 J/g, a Shore Hardness C of about 29, a Melting Temperature of about 95° C., and a Crystallization Temperature of about 27° C. The polymer blend PBC 3 of the example of the invention has an ethylene content of about 5.8 wt. %, a melt viscosity at 190° C. of about 1,367 cP, a Heat of Fusion of about 42 J/g, a Shore Hardness C of about 45, a Melting Temperature of about 96° C., and a Crystallization Temperature of about 44° C. The polymer blend PBC 4 of the example of the invention has an ethylene content of about 6.2 wt. %, a melt viscosity at 190° C. of about 1,345 cP, a Heat of Fusion of about 51 J/g, a Shore Hardness C of about 63, a Melting Temperature of about 99° C., and a Crystallization Temperature of about 57° C. The invention is not limited to PBC 1, PBC 2, PBC 3, or PBC 4 as the polymer blend.

The adhesive blends presented in the Tables 1-5 below are prepared by preheating the polymer blend with tackifier and other additives to 180° C. in a glass beaker. The components are blended by manual stirring using a spatula.

Table 1 shows adhesive formulations 1A to 1Q and its resultant physical properties when evaluated for set time, fiber tear, and failure mode. Samples 1A and 1O are comparative examples as they contain no PBC component. The fiber tear of Sample 1A is unfavorably low at 16.5° C. and 5° C. The fiber tear of Sample 1O is low at all temperatures evaluated. While Samples 2A and 1P contain the inventive PBC component, they lack the propylene polymer PP component. In contrast, Sample 1Q contains only the PP component and no propylene-based component. The formulations of Table 1 indicate that by varying the amount and type of PBC and PP component, along with the other additives (tackifier, wax, and antioxidant), the desired adhesive can be formulated depending on the targeted end use (e.g., longer set time for adhesives used in assembly applications and shorter set time for adhesives used in packaging applications). None of the formulations of Table 1 contained a functionalized polyolefin. Table 1 also shows the effect of adding a wax component of the adhesive formulation properties.

Tables 2A and 2B shows adhesive formulations 2A to 2T and its resultant physical properties when evaluated for viscosity, fiber tear, failure mode, and set time. Reference 1 is Advantra™ 9250, available from H.B. Fuller. The fiber tear for Reference 1 was slightly lower than that for Samples 2A to 2J and 2P to 2T. Likewise, the set time for Reference 1 was also lower than the set time for those same inventive samples, indicating that the inventive samples of Tables 2A and 2B would be better suited for assembly-type applications. Samples 2K to 2O of Table 2B exhibited poor fiber tear values, likely due to the high wax content in each of those samples. However, when the wax was substituted for an ethylene homopolymer, as in Samples 2I and 2J, the fiber tear values of the corresponding adhesive improved significantly.

Table 3 shows adhesive formulations 3A to 3. Reference 2 is HL 9256, a commercial adhesive available from H.B. Fuller. Samples 3I to 3L, having no ethylene polymer component or functionalized polyolefin, showed poor fiber tear values at −18° C., in comparison to Samples 3E to 3H. Samples 3A to 3D, having no ethylene polymer component, showed marginally higher set time values suitable for assembly applications.

Tables 4 and 5 shows adhesive formulations 4A to 4P and 5A to 5P, respectively, having varying amounts of the functionalized polyolefin component, wax, ethylene polymer, tackifier, and propylene component. The physical properties reported in Table 5 indicate that the selection of the amount and type of additive can effect the viscosity, PAFT, fiber tear, and set time of the resultant adhesive. Samples 4E to 4H without the functionalized polyolefin component and the ethylene polymer displayed unfavorably lower fiber tear values at all temperatures as compared to Samples 4A to 4D of Table 4. Similar results can be observed with Samples 5E to 5H as compared to Samples 5A to 5D of Table 5.

TABLE 1

|  | 1A | 1B | 1C | 1D | 1E | 1F | 1G | 1H | 1I | 1J | 1K | 1L | 1M | 1N | 1O | 1P | 1Q |
|---|---|---|---|---|---|---|---|---|---|---|---|---|---|---|---|---|---|
| PBC 1 | 0 | 83.7 | 83.7 | 83.6 | 83.3 | 82.9 | 79.5 | 75.3 | 83.7 | 83.6 | 83.3 | 82.9 | 79.5 | 75.3 | 0 | 79.5 | 0 |
| Vistamaxx™ 8816 | 83.7 | 0 | 0 | 0 | 0 | 0 | 0 | 0 | 0 | 0 | 0 | 0 | 0 | 0 | 79.5 | 0 | 0 |
| PP 1 | 0 | 0 | 0.04 | 0.08 | 0.42 | 0.84 | 4.19 | 8.37 | 0 | 0 | 0 | 0 | 0 | 0 | 0 | 0 | 83.7 |
| PP2 | 0 | 0 | 0 | 0 | 0 | 0 | 0 | 0 | 0.04 | 0.08 | 0.42 | 0.84 | 4.19 | 8.37 | 0 | 0 | 0 |
| Escorez™ 5690 | 15.8 | 15.8 | 15.8 | 15.8 | 15.8 | 15.8 | 15.8 | 15.8 | 15.8 | 15.8 | 15.8 | 15.8 | 15.8 | 15.8 | 15 | 15 | 15.8 |
| Polywax 2000 | 0 | 0 | 0 | 0 | 0 | 0 | 0 | 0 | 0 | 0 | 0 | 0 | 0 | 0 | 5 | 5 | 5 |
| Irganox™ 1010 | 0.5 | 0.5 | 0.5 | 0.5 | 0.5 | 0.5 | 0.5 | 0.5 | 0.5 | 0.5 | 0.5 | 0.5 | 0.5 | 0.5 | 0.5 | 0.5 | 0.5 |
| PHYSICAL PROPERTIES OF THE ADHESIVE COMPOSITION | | | | | | | | | | | | | | | | | |
| Set Time, seconds | 26 | >20 | 35 | 30 | 38 | 10 | 8-9 | 16-17 | 25 | 20 | 35 | 24 | 18 | 10 | 1.5 | 3 | |
| Fiber Tear, 25° C. | 100 | 100 | 100 | 100 | 100 | 100 | 100 | 100 | 100 | 100 | 100 | 100 | 100 | 91.7 | 31.8 | 85 | |
| Failure Mode, 25° C. | FT | FT | FT | FT | FT | FT | FT | FT | FT | FT | FT | FT | FT | FT | AB; FT | FT; AB | |
| Fiber Tear, 16.5° C. | 8.3 | 80 | 53.3 | 80 | 60 | 98.3 | 90.8 | 100 | 95.8 | 95 | 96.2 | 96.7 | 100 | 100 | 0 | 2.3 | |
| Failure Mode 16.5° C. | AB | FT; 1AB | FT; AB | FT; AB | FT | FT | FT | FT | FT | FT | FT | FT | FT | FT | AB | AB | |
| Fiber Tear, 5° C. | 52 | 100 | 99.5 | 98.3 | 100 | 100 | 100 | 95.8 | 100 | 100 | 100 | 71.7 | 77.5 | 90 | 0 | 0 | |
| Failure Mode, 5° C. | AB; FT | FT | FT | FT | FT | FT | FT | FT | FT | FT | FT | FT | FT | FT | AB | AB | |

TABLE 2A

|  | 2A | 2B | 2C | 2D | 2E | 2F | 2G | 2H | 2I | 2J | Reference 1 |
|---|---|---|---|---|---|---|---|---|---|---|---|
| PBC 2 | 79.5 | 75.5 | 60 | 50 | 40 | 60 | 50 | 40 | 30 | 30 | Advantra™ 9250 |
| AC 596 |  | 3 | 3 | 3 | 3 | 3 | 3 | 3 | 3 | 3 |  |
| Polywax 3000 | 5 | 1 | 1 | 1 | 1 | 1 | 1 | 1 | 1 | 1 |  |
| Epolene (C 15, N15, C18) |  | 5 (C15) | 9.5 (C15) | 14.5 (C15) | 19.5 (C15) | 9.5 (C15) | 14.5 (C15) | 19.5 (C15) | 19.5 (C18) | 19.5 (N15) |  |
| Escorez™ 5400 | 7.5 | 7.5 |  |  |  |  |  |  |  |  |  |
| Escorez™ 5600 | 7.5 | 7.5 | 13 | 15.5 | 18 | 13 | 15.5 | 18 | 23 | 23 |  |
| Escorez™ 5690 |  |  | 13 | 15.5 | 18 |  |  |  |  |  |  |
| Escorez™ 5615 |  |  |  |  |  | 13 | 15.5 | 18 | 23 | 23 |  |
| Irganox™ 1010 | 0.5 | 0.5 | 0.5 | 0.5 | 0.5 | 0.5 | 0.5 | 0.5 | 0.5 | 0.5 |  |
| PHYSICAL PROPERTIES OF THE ADHESIVE COMPOSITION | | | | | | | | | | | |
| Viscosity, 190° C. cP (177° C.) | 2,779 (3,650) | 2,954 (3,940) | 2,053 (2,691) | 1,447 (1,867) | 1,217 (1,595) | 2,142 (2,842) | 1,625 (2,266) | 1,260 (1,865) | 933 (1,308) | 683 (950) | 745 (970) |
| Fiber Tear, Room Temp | 100 | 100 | 100 | 100 | 100 | 100 | 100 | 88 | 89 | 90 | 85 |
| Failure Mode, Room Temp | FT | FT | FT | FT | FT | FT | FT | FT | AB; FT | AB; FT | FT |
| Set Time, seconds |  |  |  | 4-4.3 | 3-3.3 |  |  | 3.7-4 | 3-3.3 | 3.3-3.5 | 1-1.5 |

TABLE 2B

|  | 2K | 2L | 2M | 2N | 2O | 2P | 2Q | 2R | 2S | 2T |
|---|---|---|---|---|---|---|---|---|---|---|
| PBC 2 | 33 | 33 | 33 | 33 | 33 | 33 | 33 | 33 | 33 | 33 |
| AC 596 |  | 0.5 | 2.5 |  | 2.5 |  | 0.5 | 2.5 |  | 2.5 |
| Polywax 3000 |  |  |  |  |  |  |  |  |  |  |
| Paraflint H1 | 33 | 33 | 32 | 33 | 32 |  |  |  |  |  |
| Epolene (C 15, N15, C18) |  |  |  |  |  | 16.5 (C18), 16.5 (N15) | 33 (C18) | 32 (N15) | 33 (C18) | 32 (N15) |
| Escorez™ 5400 |  |  |  |  |  |  |  |  |  |  |
| Escorez™ 5600 |  |  |  | 17 | 16 |  |  |  | 17 | 16 |
| Escorez™ 5690 |  |  |  |  |  |  |  |  |  |  |
| Escorez™ 5615 |  |  |  | 16.5 | 16 |  |  |  | 16.5 | 16 |
| Escorez™ 5637 | 33.5 | 33 | 32 |  |  | 33.5 | 33 | 32 |  |  |
| Irganox™ 1010 | 0.5 | 0.5 | 0.5 | 0.5 | 0.5 | 0.5 | 0.5 | 0.5 | 0.5 | 0.5 |
| PHYSICAL PROPERTIES OF THE ADHESIVE COMPOSITION | | | | | | | | | | |
| Viscosity, 190° C. cP (177° C.) | 208 (280) | 210 (275) | 260 (268) | 193 (260) | 203 (273) | 1,112 (1,510) | 1,457 (1,904) | 878 (1,225) | 1,320 (1,700) | 835 (1,140) |
| Fiber Tear, Room Temp | 0 | 0 | 0 | 0 | 0 | 100 | 100 | 100 | 100 | 100 |
| Failure Mode, Room Temp | AB | AB | AB | AB | AB | AB;SSF;4FT | 2SF;4FT | FT | FT | SF;FT |
| Set Time, seconds | 1-1.3 | 1-1.5 | 1-1.3 | 1-1.3 | 1-1.3 | 2.5-2.7 | 3.5-3.7 | 2.5-2.7 | 6-6.5 | 2-2.3 | 2.5-2.7 |

TABLE 3

|  | 3A | 3B | 3C | 3D | 3E | 3F | 3G | 3H | 3I | 3J | 3K | 3L | Reference 2 |
|---|---|---|---|---|---|---|---|---|---|---|---|---|---|
| PBC 1 | 90.5 | 87.5 | 87.5 | 87.5 | 86 | 83 | 83 | 83 | 79 | 76 | 76 | 76 | HL 9256 |
| AC 596 | 3.5 | 3.5 | 3.5 | 3.5 | 3 | 3 | 3 | 3 | | | | | |
| Polywax 3000 | 5 | 5 | 5 | 5 | 3 | 3 | 3 | 3 | 5 | 5 | 5 | 5 | |
| Epolene C15 | | | | | 5 | 5 | 5 | 5 | | | | | |
| Sylvares 2040 | | | | | 2 | 2 | 2 | 2 | | | | | |
| Escorez™ 5400 | | | | | | | | | 1 | 1 | 1 | 1 | |
| Escorez™ 5600 | | | | | | | | | 14 | 14 | 14 | 14 | |
| PP1 | | 3 | | | | 3 | | | | 3 | | | |
| PP3 | | | 3 | | | | 3 | | | | 3 | | |
| PP4 | | | | 3 | | | | 3 | | | | 3 | |
| Irganox™ 1010 | 1 | 1 | 1 | 1 | 1 | 1 | 1 | 1 | 1 | 1 | 1 | 1 | |
| PHYSICAL PROPERTIES OF THE ADHESIVE COMPOSITION | | | | | | | | | | | | | |
| Viscosity, 177° C. cP | 1540 | 1350 | 1650 | 1450 | 1660 | 1545 | 1730 | 1500 | 1410 | 1330 | 1390 | 1240 | |
| Average PAFT, ° C. | 68 | 69 | 66 | 58 | 71 | 64 | 57 | 58 | 45 | 49 | 46 | 47 | |
| Mettler Softening Point, ° C. | 122.1 | 147 | 146.2 | 145.1 | 137.7 | 149.4 | 150.4 | 149.8 | 117.2 | 142.5 | 118.7 | 141.2 | 110 |
| Fiber Tear, Room Temp | 98 | 99 | 96 | 90 | 98 | 92 | 91 | 92 | 52 | 39 | 49 | 26 | 37 |
| Fiber Tear, −18° C. | 70 | 89 | 81 | 78 | 96 | 88 | 89 | 90 | 0 | 0 | 0 | 0 | 0 |
| Set Time, seconds | 1-1.5 | 1.5-2 | 1 | 1-1.5 | 1.5 | 2 | 1.5 | 1.5-1.7 | 2.5-3 | 1.7-2 | 2.5 | 1.7-2 | 1.5 |

TABLE 4

|  | 4A | 4B | 4C | 4D | 4E | 4F | 4G | 4H | 4I | 4J | 4K | 4L | 4M | 4N | 4O | 4P |
|---|---|---|---|---|---|---|---|---|---|---|---|---|---|---|---|---|
| PBC 3 | | | | | | | | | 86.5 | 81.5 | 81.5 | 81.5 | 77 | 72 | 72 | 72 |
| PBC 4 | 86.5 | 81.5 | 81.5 | 81.5 | 77 | 72 | 72 | 72 | | | | | | | | |
| AC 596 | 3 | 3 | 3 | 3 | | | | | 3 | 3 | 3 | 3 | | | | |
| Polywax 3000 | 3 | 3 | 3 | 3 | 7.5 | 7.5 | 7.5 | 7.5 | 3 | 3 | 3 | 3 | 7.5 | 7.5 | 7.5 | 7.5 |
| Epolene C15 | 5 | 5 | 5 | 5 | | | | | 5 | 5 | 5 | 5 | | | | |
| Sylvares 2040 | 2 | 2 | 2 | 2 | | | | | 2 | 2 | 2 | 2 | | | | |
| Escorez™ 5600 | | | | | 15 | 15 | 15 | 15 | | | | | 15 | 15 | 15 | 15 |
| PP1 | | 5 | | | | 5 | | | | 5 | | | | 5 | | |
| PP5 | | | 5 | | | | 5 | | | | 5 | | | | 5 | 5 |
| PP6 | | | | 5 | | | | 5 | | | | 5 | | | | |
| Irganox™ 1010 | 0.5 | 0.5 | 0.5 | 0.5 | 0.5 | 0.5 | 0.5 | 0.5 | 0.5 | 0.5 | 0.5 | 0.5 | 0.5 | 0.5 | 0.5 | 0.5 |
| PHYSICAL PROPERTIES OF THE ADHESIVE COMPOSITION | | | | | | | | | | | | | | | | |
| Viscosity, 177° C. cP | 1617 | 1900 | 1830 | 1740 | 1281 | 1480 | 1400 | 1310 | | | | | | | | |
| PAFT, ° C. | 67.9 | 70 | 70 | 56 | 62.2 | 53.4 | 48.6 | 60.3 | | | | | | | | |
| Fiber Tear, Room Temp | 99 | 99 | 77 | 93 | 95 | 86 | 86 | 92 | | | | | | | | |
| Fiber Tear, 2° C. | 91 | 90 | 78 | 78 | 79 | 56 | 78 | 8 | | | | | | | | |
| Fiber Tear, −18° C. | 89 | 80 | 76 | 88 | 17 | 0 | 16 | 0 | | | | | | | | |
| Set Time, seconds | 2 | 1.3-1.5 | 2 | 1.3-1.5 | 1.5-1.7 | 1.3-1.5 | 1.3-1.5 | 1-1.3 | | | | | | | | |

TABLE 5

|  | 5A | 5B | 5C | 5D | 5E | 5F | 5G | 5H | 5I | 5J | 5K | 5L | 5M | 5N | 5O | 5P |
|---|---|---|---|---|---|---|---|---|---|---|---|---|---|---|---|---|
| PBC 1 | 86.5 | 76.5 | 76.5 | 76.5 | 77 | 67 | 67 | 67 | | | | | | | | |
| PBC 4 | | | | | | | | | 86.5 | 76.5 | 76.5 | 76.5 | 77 | 67 | 67 | 67 |
| AC 596 | 3 | 3 | 3 | 3 | | | | | 3 | 3 | 3 | 3 | | | | |
| Polywax 3000 | 3 | 3 | 3 | 3 | 7.5 | 7.5 | 7.5 | 7.5 | 3 | 3 | 3 | 3 | 7.5 | 7.5 | 7.5 | 7.5 |
| Epolene C15 | 5 | 5 | 5 | 5 | | | | | 5 | 5 | 5 | 5 | | | | |
| Sylvares 2040 | 2 | 2 | 2 | 2 | | | | | 2 | 2 | 2 | 2 | | | | |
| Escorez™ 5600 | | | | | 15 | 15 | 15 | 15 | | | | | 15 | 15 | 15 | 15 |
| PP1 | | 10 | | | | 10 | | | | 10 | | | | 10 | | |
| PP5 | | | 10 | | | | 10 | | | | 10 | | | | 10 | |
| PP6 | | | | 10 | | | | 10 | | | | 10 | | | | 10 |
| Irganox™ 1010 | 0.5 | 0.5 | 0.5 | 0.5 | 0.5 | 0.5 | 0.5 | 0.5 | 0.5 | 0.5 | 0.5 | 0.5 | 0.5 | 0.5 | 0.5 | |
| PHYSICAL PROPERTIES OF THE ADHESIVE COMPOSITION | | | | | | | | | | | | | | | | |
| Viscosity, 177° C. cP | 1660 | 1270 | 2060 | 1800 | 1275 | 1694 | 1595 | 1450 | | | | | | | | |
| PAFT, ° C. | 60.6 | 59.9 | 65.2 | 67.6 | 57.4 | 51.7 | 46.2 | 48.9 | | | | | | | | |
| Fiber Tear, Room Temp | 98 | 78 | 82 | 67 | 100 | 67 | 71 | 64 | | | | | | | | |
| Fiber Tear, 2° C. | 92 | 76 | 81 | 66 | 54 | 11 | 26 | 12 | | | | | | | | |
| Set Time, seconds | 1.7-2 | 1.5-1.7 | 2 | 2 | 1.5-1.7 | 1 | 1 | 1-1.3 | | | | | | | | |

Certain embodiments and features have been described using a set of numerical upper limits and a set of numerical lower limits. It should be appreciated that ranges from any lower limit to any upper limit are contemplated unless otherwise indicated. Certain lower limits, upper limits, and ranges appear in one or more claims below. All numerical values are "about" or "approximately" the indicated value, and take into account experimental error and variations that would be expected by a person having ordinary skill in the art.

To the extent a term used in a claim is not defined above, it should be given the broadest definition persons in the pertinent art have given that term as reflected in at least one printed publication or issued patent. Furthermore, all patents, test procedures, and other documents cited in this application are fully incorporated by reference to the extent such disclosure is not inconsistent with this application and for all jurisdictions in which such incorporation is permitted.

While the foregoing is directed to embodiments of the present invention, other and further embodiments of the invention may be devised without departing from the basic scope thereof, and the scope thereof is determined by the claims that follow.

We claim:

1. An adhesive composition comprising:
    a polymer blend comprising a first propylene-based polymer, wherein the first propylene-based polymer is a homopolymer of propylene or a copolymer of propylene and ethylene or a $C_4$ to $C_{10}$ alpha-olefin, and a second propylene-based polymer, wherein the second propylene-based polymer is a homopolymer of propylene or a copolymer of propylene and ethylene or a $C_4$ to $C_{10}$ alpha-olefin; wherein the second propylene-based polymer is different than the first propylene-based polymer; wherein the polymer blend has a melt viscosity, measured at 190° C. and determined according to ASTM D-3236, of about 1,000 cP to about 5,000 cP;
    a propylene polymer, wherein the propylene polymer is a homopolymer of propylene or a copolymer of propylene units with from about 0.5 to about 4 wt. % ethylene of $C_4$ to $C_{10}$ alpha-olefin comonomer derived units, and wherein the propylene polymer has a melt flow rate, measured according to ASTM D-1238 at 230° C. and 2.16 kg. of less than about 1,000 g/10 min; and
    wherein the adhesive composition is substantially free of a functionalized polyolefin, wherein the functionalized polyolefin is selected from at least one of a maleic anhydride-modified polypropylene and a maleic anhydride-modified polypropylene wax.

2. The adhesive composition of claim 1, wherein the polymer blend is present in the amount of about 70 to about 90 wt. % based on the adhesive composition.

3. The adhesive composition of claim 1, further comprising one or more tackifiers.

4. The adhesive composition of claim 1, wherein the adhesive composition is substantially free of a wax.

5. An article comprising the adhesive composition of claim 1.

6. An article of claim 5, wherein the adhesive composition adheres two substrates, and wherein each substrate comprises at least one of paper, cardboard, plastic, nonwoven, metal, wood, other natural fiber based material, or combinations thereof.

7. A process to prepare an adhesive composition, comprising blending:
    (a) a polymer blend comprising a first propylene-based polymer, wherein the first propylene-based polymer is a homopolymer of propylene or a copolymer of propylene and ethylene or a $C_4$ to $C_{10}$ alpha-olefin, a second propylene-based polymer, wherein the second propylene-based polymer is a homopolymer of propylene or a copolymer of propylene and ethylene or a $C_4$ to $C_{10}$ alpha-olefin; wherein the second propylene-based polymer is different than the first propylene-based polymer; wherein the polymer blend has a melt viscosity, measured at 190° C. and determined according to ASTM D-3236, of about 1,000 cP to about 5,000 cP; and
    (b) a propylene polymer, wherein the propylene polymer is a homopolymer of propylene or a copolymer of propylene units with from about 0.5 to about 4 wt. % ethylene or $C_4$ to $C_{10}$ alpha-olefin comonomer derived units, wherein the propylene polymer is a homopolymer of propylene or a copolymer of propylene units with from about 0.5 to about 4 wt. % ethylene or C4 to C10 alpha-olefin comonomer derived units, and wherein the propylene polymer has a melt flow rate: measured according to ASTM D-1238 at 230° C. and 2.16 kg, of less than about 1,000 g/10 min;
    wherein the adhesive composition is substantially free of a functionalized polyolefin, wherein the functionalized polyolefin is selected from at least one of a maleic anhydride-modified polypropylene and a maleic anhydride-modified polypropylene wax.

* * * * *